US005925230A

United States Patent [19]
Fajt et al.

[11] Patent Number: 5,925,230
[45] Date of Patent: Jul. 20, 1999

[54] DEIONIZATION APPARATUS HAVING NON-SACRIFICIAL ELECTRODES OF DIFFERENT TYPES

[75] Inventors: James R. Fajt, Ames, Iowa; David A. Caple, Beulah; Brian B. Elson, Pueblo, both of Colo.

[73] Assignee: Southeastern Trading, LLP, Monticello, Ark.

[21] Appl. No.: 08/944,297

[22] Filed: Oct. 6, 1997

[51] Int. Cl.$^6$ .................................................. B03C 5/02
[52] U.S. Cl. ...................... 204/666; 204/672; 204/674; 204/551; 205/760
[58] Field of Search .................................. 204/551, 674, 204/672, 666; 205/760

[56] References Cited

U.S. PATENT DOCUMENTS

| | | | |
|---|---|---|---|
| 4,873,218 | 10/1989 | Pekala | 502/418 |
| 4,997,804 | 3/1991 | Pekala | 502/418 |
| 5,192,432 | 3/1993 | Andelman | 210/198 |
| 5,196,115 | 3/1993 | Andelman | 210/198 |
| 5,200,068 | 4/1993 | Andelman | 210/198 |
| 5,360,540 | 11/1994 | Andelman | 210/198 |
| 5,402,306 | 3/1995 | Mayer et al. | 361/502 |
| 5,415,768 | 5/1995 | Andelman | 210/198 |
| 5,425,858 | 6/1995 | Farmer | 204/149 |
| 5,529,971 | 6/1996 | Kaschmitter et al. | 502/416 |
| 5,538,611 | 7/1996 | Otowa | 204/551 |
| 5,547,581 | 8/1996 | Andelman | 210/656 |

OTHER PUBLICATIONS

The Use of Capacitive Deionization With Carbon Aerogel electrodes to Remove Inorganic Contaminants From Water, J.C. Farmer, et al., Paper prepared for submittal to the Low Level Waste Conference, Orlando, FL, Jul. 10–12, 1995, dated Feb. 17, 1995.

Capacitive Deionization of NaCl and NaNO$_3$ solutions With Carbon Aerogel electrodes, By Joseph C. Farmer, et al. for Lawrence Livermore national laboratory.

Capacitive Deionization System, J. H. Richardson, et al., Paper prepared for submittal to Technology 2006—The Seventh National Technology Transfer Conference and Exposition, Anaheim, CA, Oct. 29–31, 1996, dated Oct. 1996.

Desalination with Carbon Aerogel Electrodes, Joseph C. Farmer, et al., UCRL–ID–125298, dated Oct. 21, 1996.

Desalination with Carbon Aerogel Electrodes, Joseph C. Farmer, et al., UCRL–ID–125298 Rev 1, dated Dec. 4, 1996.

(List continued on next page.)

*Primary Examiner*—Bruce F. Bell
*Attorney, Agent, or Firm*—Pennie & Edmonds LLP

[57] ABSTRACT

An apparatus for deionization of a liquid is disclosed. The apparatus has a number of deionization cells, each cell having two different types of electrodes. The first type of electrode is formed from a high surface area absorptive material ("HSAAM electrode") made from resorcinol, formaldehyde, a carbon reinforcing agent, a catalyst, and reaction products thereof, and is in a carbonized form. This electrode removes ions when an electric current is applied. The second type of electrode, which does not remove ions, is formed from a non-HSAAM material. Each deionization cell has a single HSAAM electrode bordered on either side by a non-HSAAM electrode, and adjacent deionization cells do not share any electrodes of either type. The non-HSAAM electrodes are formed from carbon cloth or carbon felt fixed to one side of a plexiglass sheet, and two such sheets are needed to form a cell. The other side of each of these sheets is also provided with a carbon cloth, or carbon felt electrode, electrically isolated from that fixed to the first side. A method of making the HSAAM electrodes for the apparatus is also disclosed. The HSAAM electrodes are formed from setting a polymerized mixture of resorcinol, formaldehyde and a carbon reinforcing agent supplied in the form of carbon fibers, carbon felt or cellulose under controlled temperature and time constraints, and subsequently firing the resulting product so as to carbonize the electrode. The resulting electrodes are of a sufficient thickness to support their own weight when placed on end.

25 Claims, 11 Drawing Sheets

OTHER PUBLICATIONS

Electrosorption on Carbon Aerogel Electrodes as a Means of Treating Low–Level Radioactive Wastes and Remediating Contaminated Ground Water, Tri Duc Tran, et al., Paper prepared for submittal to Sixth International Conference on Radioactive Waste Management and Environmental Remediation, Singapore, Singapore, Oct. 12–16, 1997, dated Jul. 17, 1997.

The Application of Carbon Aerogel Electrodes to Desalination & Waste Treatment, Joseph C. Farmer, et al., Paper prepared for submittal to Annual Meeting of the American Institute of Chemical Engineers, Los Angeles, CA, Nov. 16–21, 1997, dated Aug. 1, 1997.

Modeling the Corrosion of High–Level Waste Containers: CAM–CRM Interface, Joseph Farmer, et al., Paper prepared for submittal to Spectrum '98, American Nuclear Society, Denver, CO, Sep. 13–18, 1998, dated Dec. 9, 1997.

Development of Integrated Mechanistically–Based Degradation–Mode Models for Performance Assessment of High–Level Waste Containers, Joseph Farmer, et al., UCRL–ID–130811, dated Jun. 1998.

Iron concentration vs. time for batch processed sample.

Copper concentration vs. time for batch processed sample.

Sodium concentration vs. time for batch processed sample.

Calcium concentration vs. time for batch processed sample.

Magnesium concentration vs. time for batch processed sample.

DEIONIZATION APPARATUS HAVING NON-SACRIFICIAL ELECTRODES OF DIFFERENT TYPES

BACKGROUND OF THE INVENTION

The present invention relates to carbon aerogels, electrochemical cells and systems for deionization and purification of water effluents.

Resorcinol is a well-known material commonly used in resins, dyes, adhesives, pharmaceuticals, and other applications. It can be obtained in a variety of grades and forms, such as crystals, flakes, pellets, and the like. Resorcinol, in its various forms, is soluble in water, alcohol, ether, benzene, glycerol and formaldehyde.

As disclosed in U.S. Pat. No. 5,425,858 to Farmer, resorcinol can be used to synthesize carbon aerogels. Specifically, carbon aerogel can be produced by the polycondensation of resorcinol and formaldehyde in a slightly basic medium, followed by supercritical drying and pyrolysis in an inert atmosphere. Thin electrodes formed from such carbon aerogels may be used in capacitive deionization applications, as disclosed in this reference, whose contents are incorporated by reference in their entirety.

The thin electrode plates (approximately 0.25 mm thickness) formed by this process, however, have a number of drawbacks. First, they are prohibitively expensive to use on a commercial scale, costing on the order of $1000/square inch of surface area. Second, a device using these electrodes has only been effectively driven at voltages and currents lower than those at which water is electrolyzed. Also, the thin nature of the plates limits the deionization capacity. The thin plates are not self supporting and it is difficult to make a direct reliable electrical connection with these. Finally, these electrodes are glued to a titanium plate and so one of each of these plates is unavailable for use as a deionization surface.

SUMMARY OF THE INVENTION

The present invention is directed to a deionization apparatus comprising a tank having a plurality of deionization cells. Each deionization cell comprises three non-sacrificial electrodes of two different types. One electrode comprises a high surface area absorptive material ("HSAAM electrode") formed as a plate having two sides facing in opposite directions. The HSAAM electrode removes ions from the liquid being deionized. This HSAAM electrode is bordered by two electrodes, one on either side, which do not remove ions from the liquid being deionized.

The bottom of the tank may be provided with a network of pipes for conducting air, each pipe being provided with small holes through which air may escape. Air pumped through these pipes agitates and mixes the liquid being deionized, thus promoting the contact and capture of ions on the HSAAM electrodes.

The non-HSAAM electrodes in the present invention are present in the form of carbon cloth (CC) or graphite plate electrodes affixed to either side of a flat, nonconductive structural support member. The non-HSAAM electrode on one side of the structural support member is electrically isolated from the non-HSAAM electrode on the other side of the structural support member. Thus, each non-HSAAM electrode is associated with a different HSAAM electrode. This results in a deionization cell comprising first and second non-HSAAM electrodes, each mounted on a different structural support member, but facing the same HSAAM electrode sandwiched therebetween.

The HSAAM electrodes used in the deionization cells are produced by first dissolving resorcinol in formaldehyde to form an initial liquor. A catalyst is added to promote polymerization and to effect the final structure of the HSAAM. A predetermined amount of a non-sacrificial material is introduced to the liquor as a reinforcing material. Sufficient heat is added by heating the mixture at a sufficient temperature or for a sufficient time such that a controlled polymerization takes place and the mixture reaches a consistency sufficient to support the reinforcing material. The resulting viscous liquid is then allowed to continue polymerization to form a solid in a mold. The resulting brick is then fired in an oven until it is carbonized, after which it is machined for subsequent use in the apparatus.

BRIEF DESCRIPTION OF THE DRAWINGS

These and other features, aspects, and advantages of the present invention can be seen in the drawings in which.

DESCRIPTION OF THE PREFERRED EMBODIMENT

Figure 1:
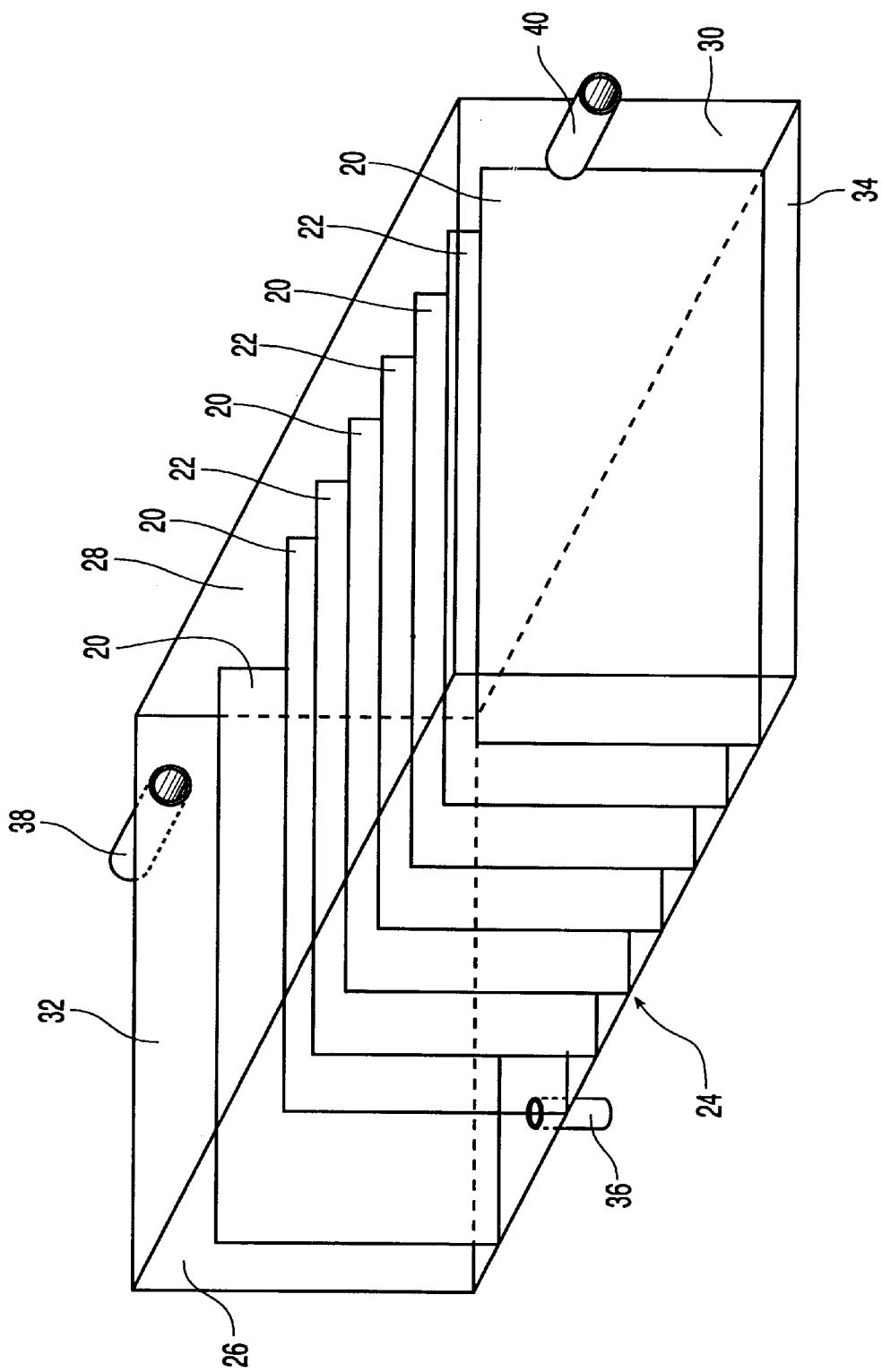
FIG. 1 is a perspective view of an apparatus formed in accordance with the present invention.

FIG. 1 shows an apparatus 18 made in accordance with the present invention. The apparatus comprises a number of parallely arranged, upstanding electrodes 20, 22. As discussed below, two different types of electrodes are provided, and these alternate.

The electrodes of the apparatus are mounted widthwise in a substantially rectangular chamber or tank 24. The tank itself comprises a pair of side walls 26, 28, a pair of end walls 30, 32, and a flat bottom 34. The tank walls are preferably formed from glass, plastic, plexiglass, or other electrically insulative, water-tight material.

Figure 3:
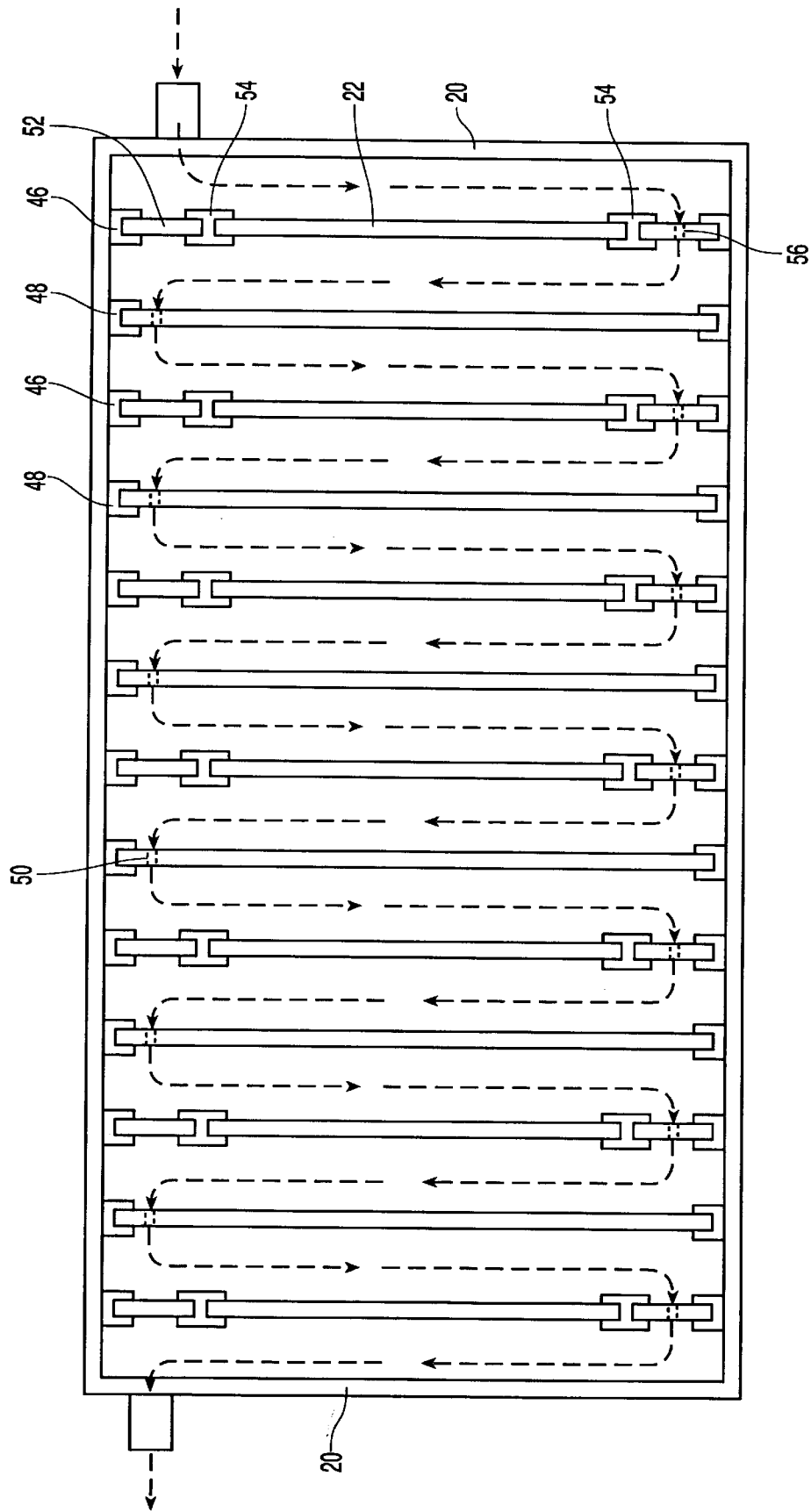
FIG. 3 is a top view of the apparatus of FIG. 1 arranged for serpentine flow.

An inlet 36 formed in the bottom and an outlet 38 in a first end wall provide for the entry and exit of a liquid that is deionized while in the tank. Alternatively, the inlet may be formed in the second end wall when serpentine flow, as depicted by the dashed path in FIG. 3, is desired. Also, multiple inlets and outlets, spaced apart from one another in the bottom, or sides, may be provided when a single tank is employed to deionize liquids from different sources, each liquid having ions of different polarities and sizes to be removed.

At the base of the tank is an air diffuser 42 through which air is introduced. As shown in FIG. 2A, the air diffuser comprises a number of parallely arranged pipes 44 formed from styrene or the like and have small openings formed therein. The pipes 44 extend across the width of the tank, and, in the preferred embodiment, are placed between facing electrodes. When the apparatus is operational, air is pumped through these pipes to aerate and agitate the liquid in the tank. This promotes deionization by mixing the liquid within the tank and agitating the ions between oppositely charged electrodes.

It should be evident to one skilled in the art that equivalent aeration means may be used in place of the network of parallel tubes provided with openings. For example, a false bottom may be provided and air, pumped between the tank bottom and false bottom, would percolate through openings formed in the latter. Another alternative is to place a substantially flat plastic bladder on the tank bottom and air, once pumped into the bladder, could enter the liquid through openings in a top side thereof.

The side walls 26, 28 of the tank are provided with a row of mounting clips, also molded from styrene or other plastic, on their inward facing surfaces. The mounting clips 46, 48, as shown on FIG. 2a, serve to align and retain electrodes inserted into the tank. Mounting clips 46 and 48 may differ in size, shape and materials, depending on the physical and chemical properties of the electrodes 20, 22, which they are designed to accommodate.

An electrode may be inserted, at each side edge thereof, directly into opposing mounting clips. In such case, the electrode may be formed with an opening 50, as shown in FIG. 3, adjacent to where it is inserted into the mounting clip. This opening 50 serves as a passage through which liquid may pass as it courses through the tank.

Alternatively, an electrode may be indirectly held by a mounting clip via an acrylic spacer 52 on one or both of its ends, the acrylic spacer being fixed to the electrode by means of a connecting clip 54. In such case, an opening 56 may be formed in the acrylic spacer itself to allow liquid to pass therethrough. This arrangement is especially advantageous when the opening cannot be formed in the electrode itself, for structural, electrical, or other reasons.

Figure 2B:
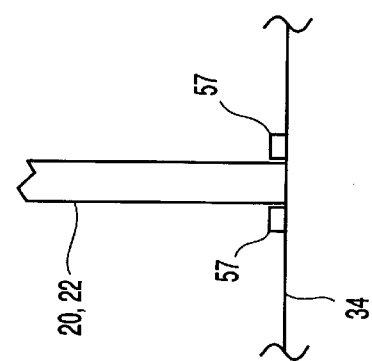
FIGS. 2B and 2C show two arrangements for immobilizing the HSAAM plates within the tank.
Figure 2C:
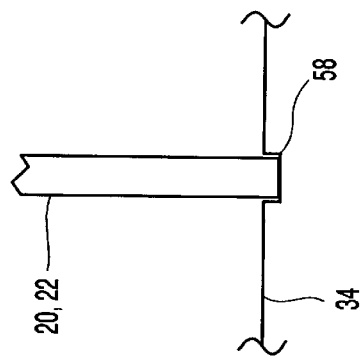
Figure 2A:
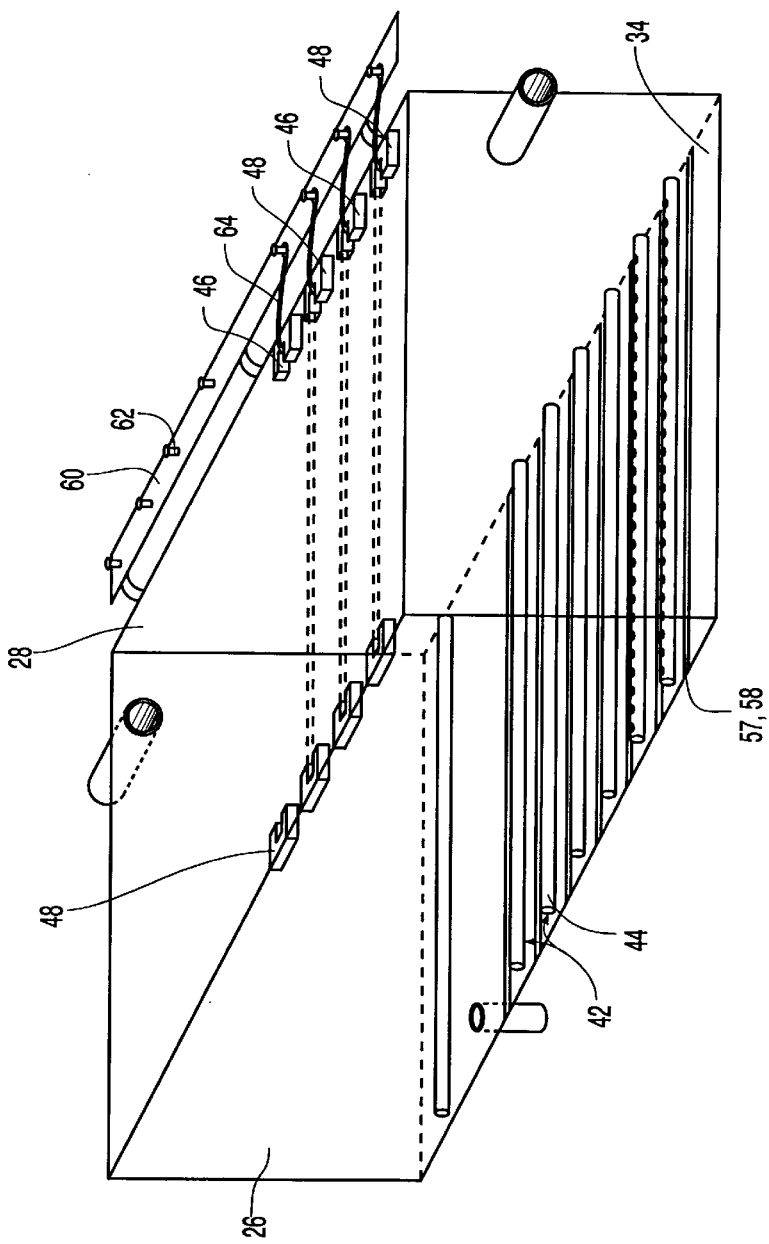
FIG. 2A is a view of the tank used in the apparatus of the present invention.

In addition, the bottom 34 of the tank can be provided with plastic guard members 57, as seen in FIG. 2B, or grooves 58, as seen in FIG. 2C which extend widthwise across the tank. Such guard members and grooves allow one to selectively, slideably adjust electrodes towards one side wall or the other. This is especially advantageous when it is desired to have serpentine flow of the liquid past each face of each electrode, from the inlet at one end wall of the tank to the outlet formed at the opposite end wall. As an alternative to a guard member or a groove along which an electrode may slide, a central portion of the bottom wall may be provided with slots into which upstanding bottom clips or spring-loaded retainers are inserted. The bottom edge of an electrode may then be inserted into these bottom clips or retainers at any desired distance from either side wall. As described above, acrylic spacer bars may be used to bridge the gap between the free edge of the electrode and the mounting clip.

A busbar 60 may be provided on the exterior side walls of the tank. Each busbar is provided with a plurality of terminals 62 electrically isolated from one another, each one arranged to be connected to an associated electrode. This allows one to individually control the voltage, and the current, applied to each electrode. The individual terminals can be electrically connected to their associated electrodes with conventional electrical leads such as alligator clips or equivalent connecting means. More preferably, however, the individual terminals may be connected, by means of a copper wire 64 connected via a non-sacrificial graphite rod to either the corresponding mounting clips or, when used, the corresponding connecting clip. The electrode then contacts the graphite rod when the electrode is inserted into the mounting or connecting clip. To facilitate this electrical contact, a leaf spring, or the like, may be affixed to the end of the conductive strip, in a known manner. The leaf spring can then be secured to the channel of the clip in which the electrode's edge is inserted.

As stated above, two types of conductive, non-sacrificial electrodes are used in an apparatus formed in accordance with the present invention. In the preferred embodiment, a first type of electrode, formed as a flat plate is bordered on either of its sides by a second type of electrode. Together, the three electrodes form a deionization cell. During operation, a substantially similar voltage potential is normally established between an electrode of the first type and each of the electrodes of the second type. This is accomplished by connecting one lead of a voltage source to the electrode of the first type and a pair of common leads from that same voltage source to each of the two electrodes of the second type. The common leads ensure that a substantially similar potential is maintained between the electrode of the first type and each of the electrodes of the second type bordering the electrode of the first type.

The first type of electrode (22) is formed from a carbon based high surface area absorptive material ("HSAAM electrode"). This electrode removes and retains ions from an aqueous solution when an electrical current is applied. In the preferred embodiment, the HSAAM electrode is formed from resorcinol, formaldehyde, at least one of carbon fiber, carbon felt and cellulose, a catalyst, and reaction products thereof, in a carbonized form. The process for forming an HSAAM electrode is described further below.

The second type of electrode (20), though formed from a conductive material, does not remove or retain ions when an electric current is applied and so is non-absorptive ("non-HSAAM electrode"). This property is common to electrodes formed from carbon cloth, graphite, gold, platinum, and other conductive materials which do not degrade in an electric field in an aqueous solution. In the preferred embodiment, the non-HSAAM carbon electrode is formed from either graphite, or more preferably from carbon cloth, such as part no. PANEX 30 woven fibers available from Zoltek.

Figure 4B:
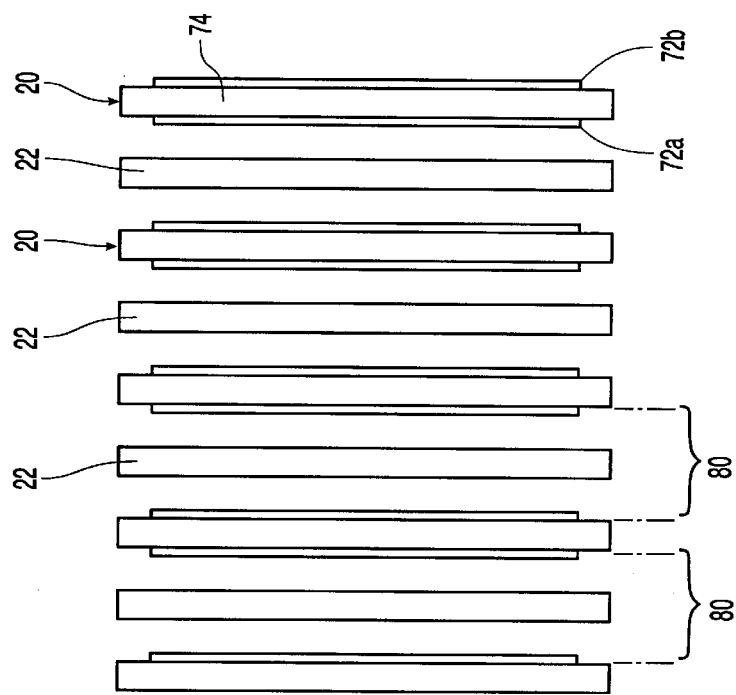
FIGS. 4a and 4b show a deionization cell formed from neighboring electrodes.
Figure 4A:
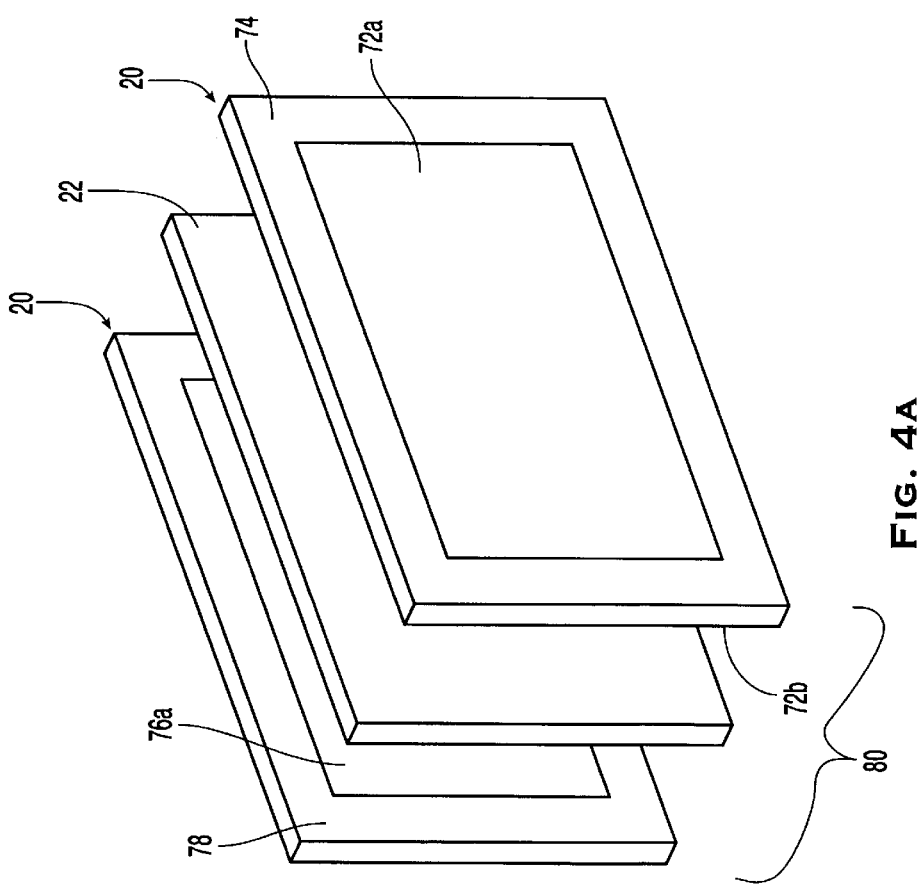

As shown in FIG. 4a, the non-HSAAM carbon electrode 20 is formed as a dual electrode in that it has a pair of conductive surfaces which are electrically isolated from one another. The dual electrode 20 is formed by fixing a separate piece of carbon cloth 72a, 72b to either side of a ⅜" thick sheet of plexiglass 74. The plexiglass serves as a nonconductive, structurally rigid support member, and also prevents the flow of liquid directly through both pieces of carbon cloth. Thus, glass, acrylics, and the like may be used in place of plexiglass. In the preferred embodiment, the carbon cloth is secured to either side of the plexiglass sheet by means of an epoxy adhesive. As is known to those skilled in the art, other adhesives, and even mechanical securing means such as screws, clips, and the like may be used to secure the carbon cloth (CC) electrode.

Once secured to either side of the plexiglass sheet 74, the carbon cloth 72a on one side may, if desired, be electrically connected to its counterpart 72b on the other side of the same sheet 74. Usually, however, this is not the case, so that one may apply different voltages to the carbon cloth on each side of the plexiglass, by means of separate voltage sources. In such case, adjacent cells within a single tank may be driven by different voltage sources.

As shown in FIG. 4b, in an apparatus of the present invention, these two-sided non-HSAAM electrodes 20 are alternated in the tank with the HSAAM electrodes 22, to each of which only a single voltage may be applied at any given time. Thus, in an apparatus of the present invention, one side of an HSAAM electrode faces a CC electrode 72b affixed to a first sheet 74 of plexiglass, while the second, reverse side of the HSAAM electrode, faces a CC electrode 76a affixed to a second sheet 78 of plexiglass. In this manner, each of the HSAAM electrodes 22 with its pair of corresponding non-HSAAM cloth electrodes form a deionization cell 80. End walls 30, 32 have a carbon cloth electrode affixed on their inwardly facing sides, which electrode becomes part of a cell.

In use, two CC electrodes 72b, 76a which face the same HSAAM electrode 22 are usually maintained at the same polarity and voltage level. Alternatively, if desired, they can be maintained at different levels, as each is provided with its own terminal 62 on the busbar 60. When voltage is applied between the HSAAM electrode 22, and its corresponding non-HSAAM electrodes 72b, 76a, the cell 80 is activated and deionization takes place on both sides of the HSAAM electrode 22. Preferably, the same voltage level is applied to both non-HSAAM electrodes of a single cell. If, however, the two non-HSAAM electrodes on either side of an HSAAM electrode have different surface areas and so can sustain different current densities, it may be possible to drive them at different voltages.

An HSAAM electrode can be positively or negatively charged with respect to the non-HSAAM electrode. When the HSAAM electrode is charged positively, it attracts, absorbs and holds negative ions. This causes the pH of the water in the immediately vicinity of the cell to increase, or become more caustic. When the HSAAM electrode is negatively charged, it attracts, absorbs and holds positive ion, thus lowering the pH of the water, and making it more acidic.

As each HSAAM electrode 22 is bordered on either side by its own pair of CC electrodes, adjacent deionization cells within the same tank can be used to remove different types of ions. Thus, if a pair of spaced apart inlets or outlets are provided on the bottom or sides of the same tank, the deionization cells proximate to these inlets may be activated such that a first set of cells removes ions of a first type, and a second set of cells removes ions of a second type. Similarly, when serpentine fluid flow is desired, the first, upstream set of cells encountered by the fluid may be activated to remove ions of a first type, while a second, downstream set is activated to remove ions of a second type.

In a given tank, a plurality of cells are typically present. In order to completely deionize the water in the tank, both negatively and positively charged HSAAM electrodes should be present. In general, different voltages should be applied to positive and to negative cells to effect ion removal, and the number of positively and negatively charged cells may not be the same. This allows positively and negatively charged HSAAM electrodes to be activated independently and at different voltage levels. Varying the plate spacing and applied voltage, may enable the removal of specific ions from the fluid being treated.

Figure 5:
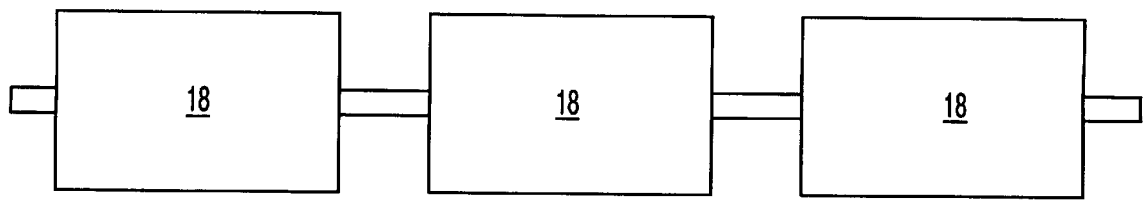
FIG. 5 shows an apparatus with three serially connected devices.

As shown in FIG. 5, multiple tanks may be chained together, the outlet of one being connected to the inlet of the next. In such case, the deionization cells in each tank may be activated in a common manner so that each tank focuses on the removal of one type of ion. Alternatively, successive tanks may be used to remove ever decreasing amounts of the same ion.

Figure 6A:
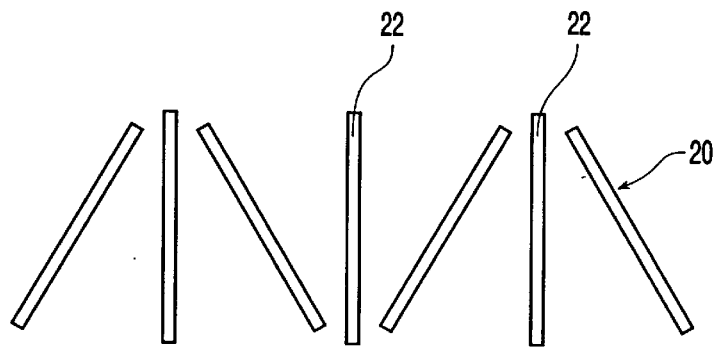
FIGS. 6A and 6B show alternatives to having all the electrodes parallel to one another.
Figure 6B:
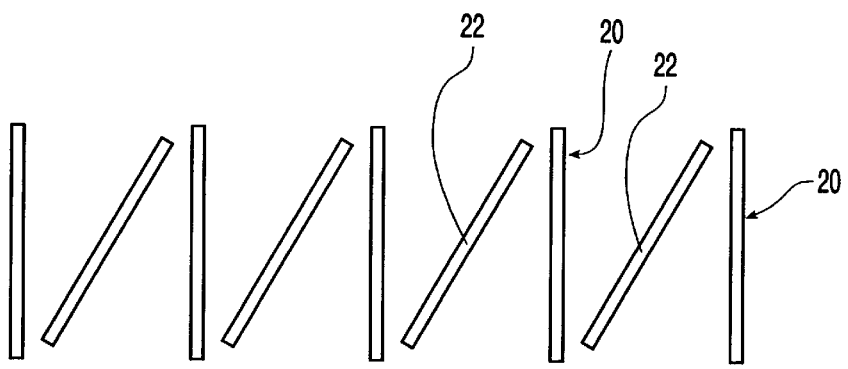

As shown in FIGS. 6A and 6B, it is possible to have electrodes of one type angled slightly with respect to the electrodes of the other type. In FIG. 6A, the HSAAM electrodes are shown to be both parallel to one another and upright. In contrast, the non-HSAAM carbon cloth electrodes on either side of an HSAAM electrode are angled symmetrically about the HSAAM electrode. In such case, adjacent HSAAM electrodes have their respective carbon cloth electrodes angled in a different manner. Similarly, as shown in FIG. 6B, one may have the carbon cloth electrodes standing upright, while the HSAAM electrodes are angled with respect to the carbon cloth electrodes. In the configuration of FIG. 6B, the HSAAM electrodes are still parallel to one another, but are angled with respect to, say, the base and walls of the tank.

Figure 7:
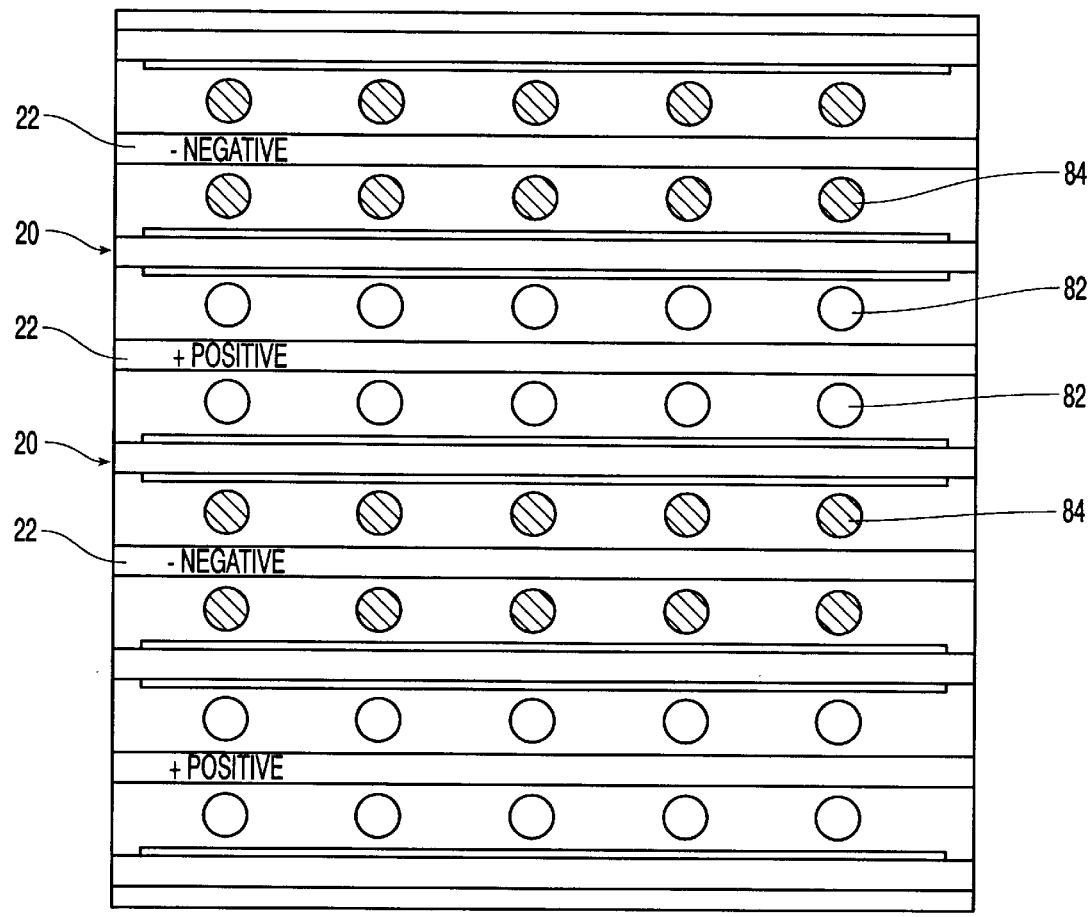
FIG. 7 presents a top view of a tank having ion exit holes formed therein.

FIG. 7 shows a top view of a tank comprising four deionization cells. A first pair of deionization cells having positively charged HSAAM plates are interleaved with a second pair having negatively charged HSAAM plates. The base of the tank, in the region underlying each deionization cell, is provided with an array of holes. For the positively charged deionization cells, these are shown as holes 82, and for the negatively charged deionization cells, these are shown as holes 84.

The purpose of holes 82, 84 is to allow for the selective removal of positive and negative ions collected on the HSAAM plates when the tank is operational. Thus, in those cells having positively charged HSAAM plates, negative ions will collect on the plates. When the cell is regenerated, these ions may be collected through the holes 82. Similarly, during regeneration, the ions collected on the negatively charged HSAAM plates, may be collected through holes 84. As shown in FIG. 7, holes 82 and 84 have approximately the same size and arrangement. This, however, is not a necessity. For instance, the holes for the negatively charged ions may be smaller than those for the positively charged ions. Also, instead of an array of holes arranged parallel to the HSAAM and non-HSAAM electrodes, the holes may appear in more irregular patterns, such as a checkerboard or a honeycomb.

As stated above, the HSAAM electrode is formed from a high surface area absorptive material. In the present invention, this material is formed by an inventive process which requires three ingredients: resorcinol, formaldehyde and a reinforcer, such as a carbon source. A catalyst may also be used to facilitate polymerization of the resorcinol-formaldehyde resin.

Resorcinol comes in many different grades, and can be obtained from a number of suppliers in pellets, flakes, and other convenient forms. In the examples given below, resorcinol in the form suitable for organic chemical formulations, from the Hoechst Celanese Company, was used.

Formaldehyde is available from a variety of suppliers, and also comes in different grades and forms. In the examples given below, formaldehyde in form of formalin, which is suitable for dyes, resins and biological preservation, from the Georgia-Pacific Resin, Spectrum Chemical Company was used.

The carbon source used as reinforcement in the formation of the HSAAM electrodes can come in different forms. For instance, loose carbon fibers, such as THORNEL® P25 4K ¼" cut carbon fiber fibers, available from Amoco, have been successfully used to form HSAAM electrodes for use in the present invention. An alternative which has also successfully been used is carbon felt, either graphite felt grade wdf 3331060 or carbon felt VDG 3330500, both available from the National Electric Carbon Company. In general, a predetermined quantity of any relatively pure carbon source can be used so long as it can either be fully dispersed in a resorcinol-formaldehyde liquor which then sets, or can absorb a similar quantity of the liquor in a matrix, and then set. It is important that the carbon fibers be electrically conductive.

Although the preferred embodiments of the second type of electrode call for carbon cloth or carbon felt, the important thing is that a non-sacrificial electrical conductor be used. Therefore, such materials as graphite, gold, platinum, conductive plastics, glassy carbons such as SIGRADUR, available from SGL Carbon Group of St. Mays, Pa., and the like, may be used in place of the carbon cloth or carbon felt.

Regardless of the reinforcer used, the process of forming the HSAAM electrodes begins the same way. 4 lbs. of resorcinol solid is added to 3.5 liters of formaldehyde, giving approximately a one-to-two molar ratio, at room temperature. The quantities stated, of course, may be scaled linearly, either upwards or downwards, to make different total quantities of this initial mix. This initial mix is mixed for between 30 and 90 minutes, or until the resorcinol dissolves.

When the resorcinol completely dissolves, the resulting mixture has an amber to pink color. If this mixture is maintained at or below room temperature, i.e, about 72° F. for about 12 to 24 hours after dissolution of the resorcinol, this color then turns into a milky and opalescent liquor.

A predetermined quantity of a sodium carbonate catalyst is added to a measured portion of the liquor and the carbon source and liquor are fully combined.

The resulting material is then heated and poured into an 8"×8" mold to a thickness of approximately ¾" where it is allowed to set into a xero gel (consisting of polymerized resorcinol-formaldehyde) block. The mold is placed on level surface at room temperature where the polymerization reaction is allowed to continue in air as the material turns into a xero gel block. It takes approximately 20 to 60 minutes for the material in a mold to solidify at room temperature. As it solidifies, the material shrinks by about 0.5–1.0% in each dimension, and pulls away from one or more side walls of the mold. The block can then be removed by simply turning the mold upside down.

Upon being removed from its mold, each block is allowed to cure and harden at approximately 80°–90° F. in air for about two hours, to ensure complete polymerization. Unlike prior art curing techniques, the curing process in the present invention does not entail critical point drying (i.e., supercritical drying). This saves considerable time and cost. While curing removes some of the excess liquid, the resulting block is still a very poor conductor of electricity.

After curing, the blocks are laid flat in an oven and then carbonized. During carbonization, a weight is placed on each block to prevent cracking, uneven buckling, and curling of its edges. Carbonization is preferably done at a temperature of about 1850°–2200° F. Experimentation has shown, however, that temperatures as low as 1750° F. and carbonization times between 10–20 minutes are also acceptable, the lower the temperature, the longer the carbonization time. Subjecting the blocks to this temperature causes further desiccation and burns off many of the impurities present in the original ingredients. In the preferred embodiment, carbonization can be carried out in an air environment, as the thickness of the blocks can withstand some loss of material due to burning. This contrasts with prior art techniques in which a nitrogen or other inert gas atmosphere had to be used to prevent relatively thin blocks from being consumed during carbonization.

Once carbonization is complete, the resulting HSAAM plates can then be machined and sanded into planar electrodes of a desired shape, size and thickness. Preferably, the electrodes have a sufficient thickness to be self-supporting (e.g., able to withstand their own weight when placed on end). This requires a thickness of about at least 1 mm for a 2"×4" electrode. Plates thinner than this may be formed, but the brittleness of the material makes such thin plates difficult to handle and severely limits their capacity to remove and store ions from solution. In general, the thickness of the plate should be made in proportion to their surface area, larger plates typically needing to be thicker. Regardless of thickness, after carbonization, the block is a good conductor of electricity.

The exact details of the step of adding the catalyst and the carbon source to the liquor can be performed in more than one way, depending on the type of carbon source used. This step is now considered in further detail.

First, is the case where the THORNEL® carbon fibers are used. Eight hundred milliliters (mls) of the liquor are poured into a blender, along with 3 ounces of the aforementioned ¼ THORNEL® carbon fibers, and 10 mls of a 1.0 molar solution of sodium carbonate, which serves as the catalyst to promote polymerization. This combination is then blended for approximately 3–5 minutes until the carbon fibers are and liquor are fully combined together. As it is blended in, the carbon fibers are further chopped into even smaller pieces. The outcome of this blending is a viscous, black broth which includes the resorcinol/formaldehyde liquor mixed with the sodium carbonate, and carbon fibers combined therewith. The temperature of the broth after the blending step is about 90° F. It should be noted here that, although only 800 mls of liquor were used in this example, the process is scalable. Thus, several liters, or even more, may be batch processed at the same time.

1600 mls of broth made in this manner are then transferred to a stainless steel mixing bowl and the broth is then gradually heated using an electric table heater. As it is heated, the broth is stirred and its temperature is closely monitored. In this manner, the temperature of the broth is allowed to rise over a period of 25 to 45 minutes maintaining the temperature at approximately 130–140° F., 135° F. being the optimum temperature.

During the heating process, the temperature of the broth is controlled so that it does not exceed 150° F. causing the polymerization to run out of control. Temperature control can be effected by a number of means such as thermoelectric cells, coils having coolant circulating therethrough, and even water baths into which the mixing bowl may be lowered. Automatic temperature regulation may also be performed using any of several well known monitoring and control devices.

The consistency of the broth is also monitored during the heating process. This ensures that the carbon fibers do not clump together or settle, resulting in unevenly dispersed agglomerations of matted carbon fiber. If this happens, the broth may be placed back in the blender to further homogenize its contents.

The broth is maintained at a temperature of approximately 135° F., and is continuously stirred to provide for uniform polymerization. This temperature is maintained for about 35 minutes, at which time a slight skin forms on the surface of the broth whenever the broth is not stirred for a few seconds. As the polymerization continues, the broth thickens, becoming increasingly viscous until it reaches a consistency such that the carbon fibers are suspended within the broth as colloidal particles. When this point is reached, the heated broth is poured into an 8"×8" mold to a thickness of approximately ¾".

It should be noted here that the temperature of the broth when it is poured should be in the range of 135°–150° F. or so. This helps ensure that when the broth sets, the resulting solid blocks have isotropic mechanical and electrical properties. When the broth is poured at, or allowed to exceed, temperatures above 150° F., a runaway reaction takes place, resulting in deformed blocks having boils and other uneven surface and volumetric features. These result in a block with structural and electrical anisotropy.

The second case is where carbon felt, plain cellulose fiber, or cellulose fiber impregnated with activated carbon is used to reinforce the resorcinol-formaldehyde resin. The carbon fiber felt, or mat, is cut to fit into the mold. Resorcinol-formaldehyde liquor is then poured into the mold to cover the carbon felt, thereby displacing air trapped within the felt. The mold is then transferred into a curing oven set at 92° F. and allowed to polymerize for approximately 72 hours so as to form a xero gel block. The xero gel is then placed in an oven and carbonized at between 1850–2200° F. While being carbonized in the oven, the xero gel was restrained with a force of 0.5–0.8 lbs/in$^2$ in the form of refractory blocks. The oven used for this purpose was an electric muffle furnace having a top vent. The result of this carbonization is an HSAAM product. After the HSAAM was removed from the furnace, it was allowed to cool in air. The cooled HSAAM was then machined on a flat sanding wheel to a desired uniform thickness. Finally, this plate was squared utilizing a carbide tipped table saw.

Regardless of the carbon source used, the resulting blocks are black in color and serve as conductors of electricity.

In the above description, resorcinol is used as one of the ingredients. However, experimentation has shown that suitable blocks can be formed using one of the following chemicals in place of resorcinol: 1,5-dihydroxy naphthalene, 2,3-dihydroxy naphthalene, 1,4-dihydroxy naphthalene and 1,4-dihydroxy benzene. Each of these chemicals was found to form a polymer with formaldehyde, successfully carbonized into a block, and subsequently deionized water when a current was applied. In general, then, it is believed that any dihydroxy or trihydroxy benzene or naphthalene can be used in place of resorcinol. This is because these chemicals are similar in chemical structure, share the characteristic of forming a polymer with formaldehyde, and are likely to form carbonized blocks which can be used in ion removal. Presently, resorcinol is preferred because of its low cost, its wide availability in large quantities, and its amenability to reacting with formaldehyde at room temperature and pressure.

Figure 8:
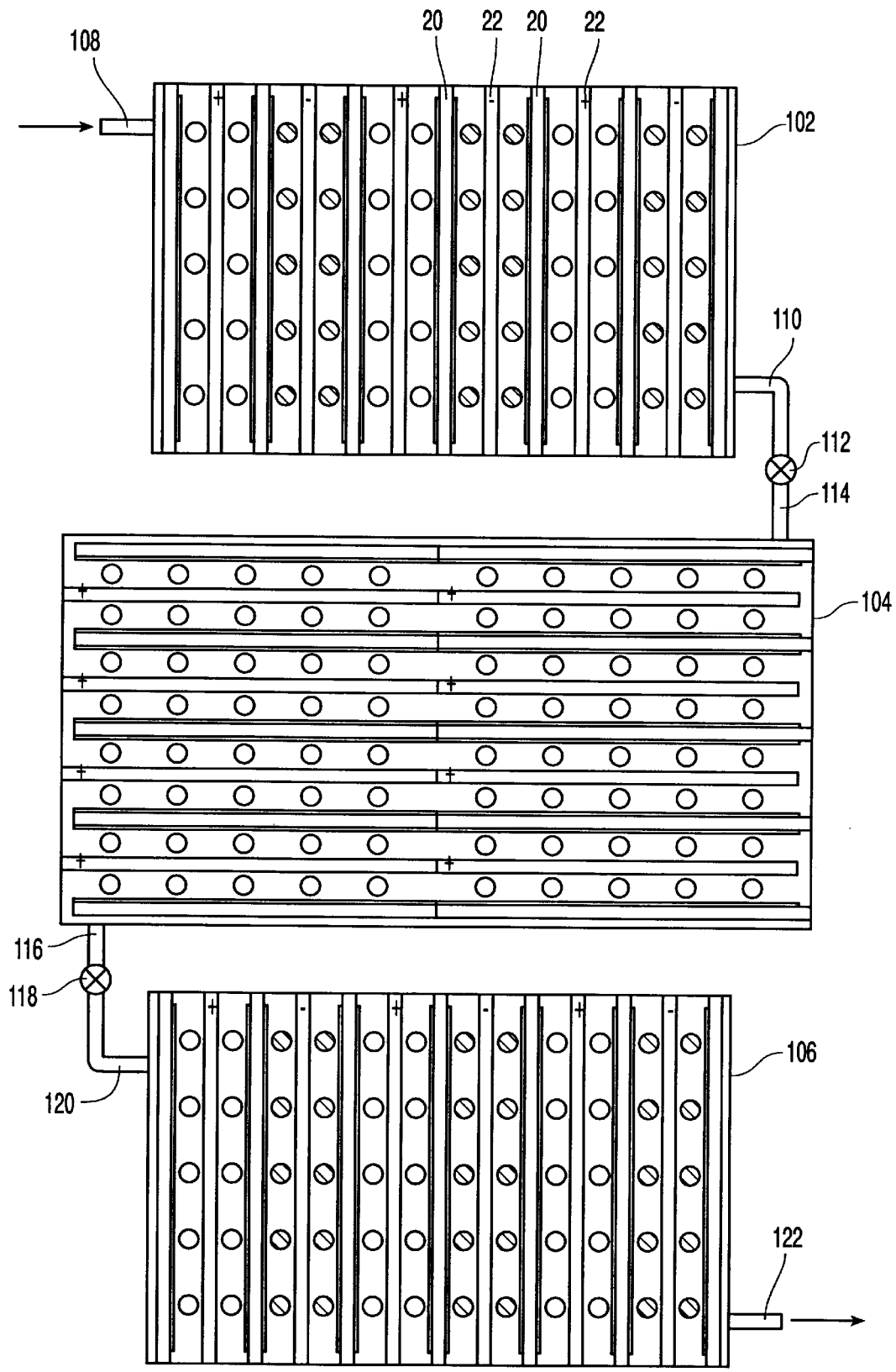
FIG. 8 shows an experimental apparatus constructed along the lines of that shown in FIG. 5.
Figure 9A:
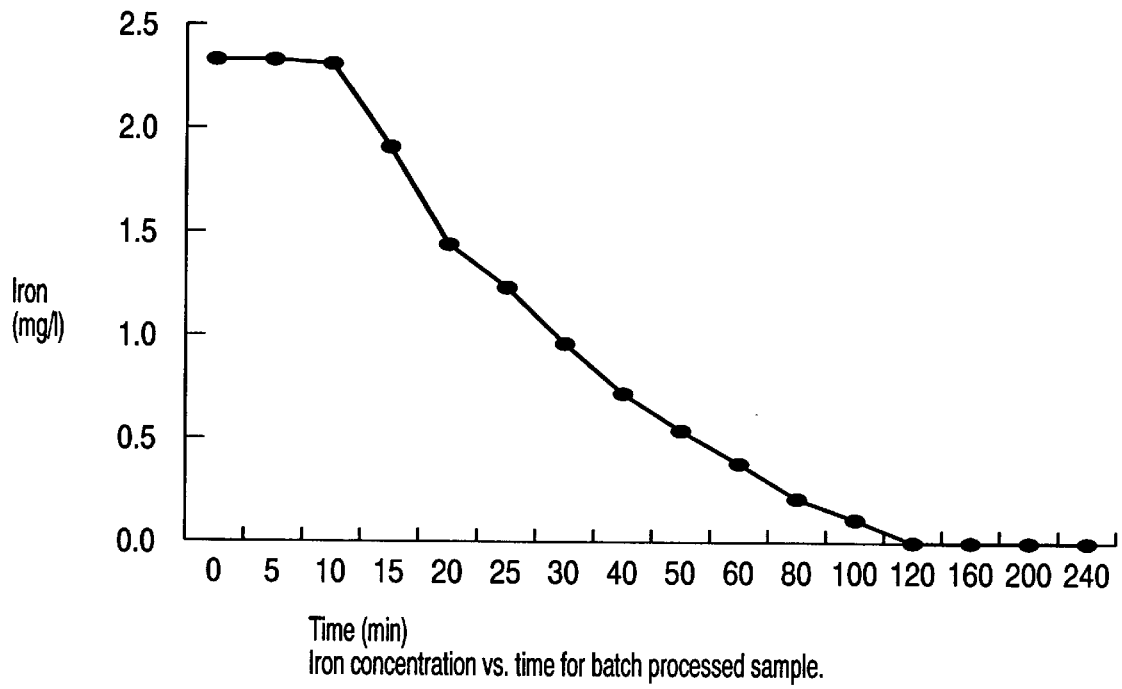
FIGS. 9A–9E present batch processing results using the apparatus of FIG. 8.
Figure 9B:
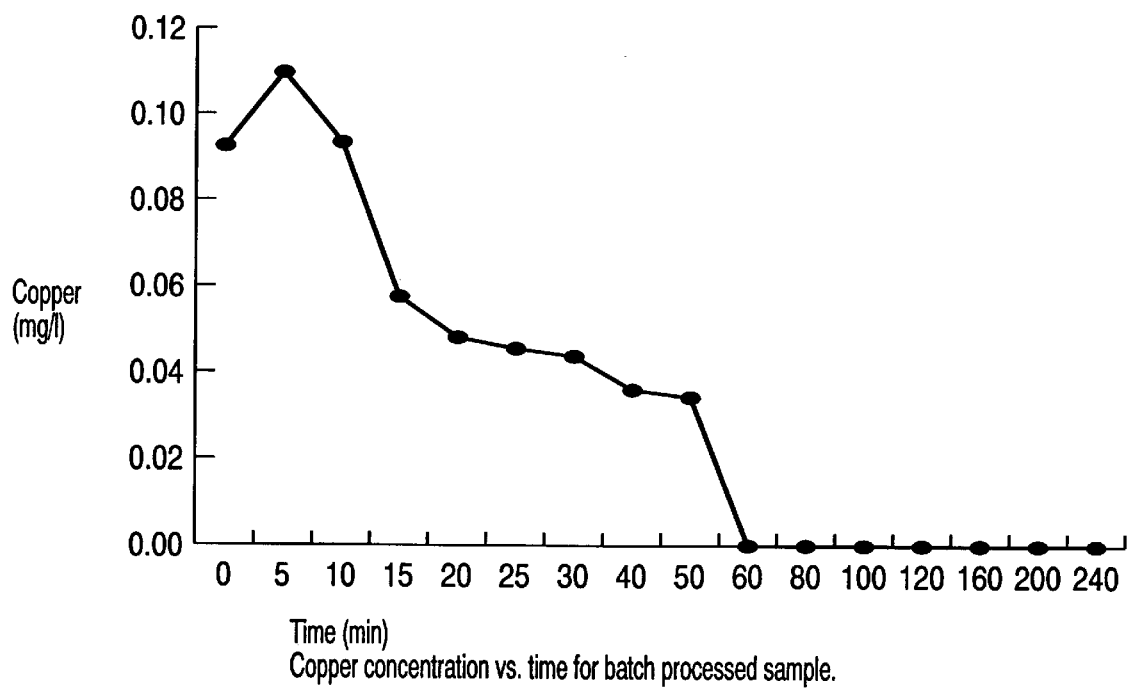
Figure 9C:
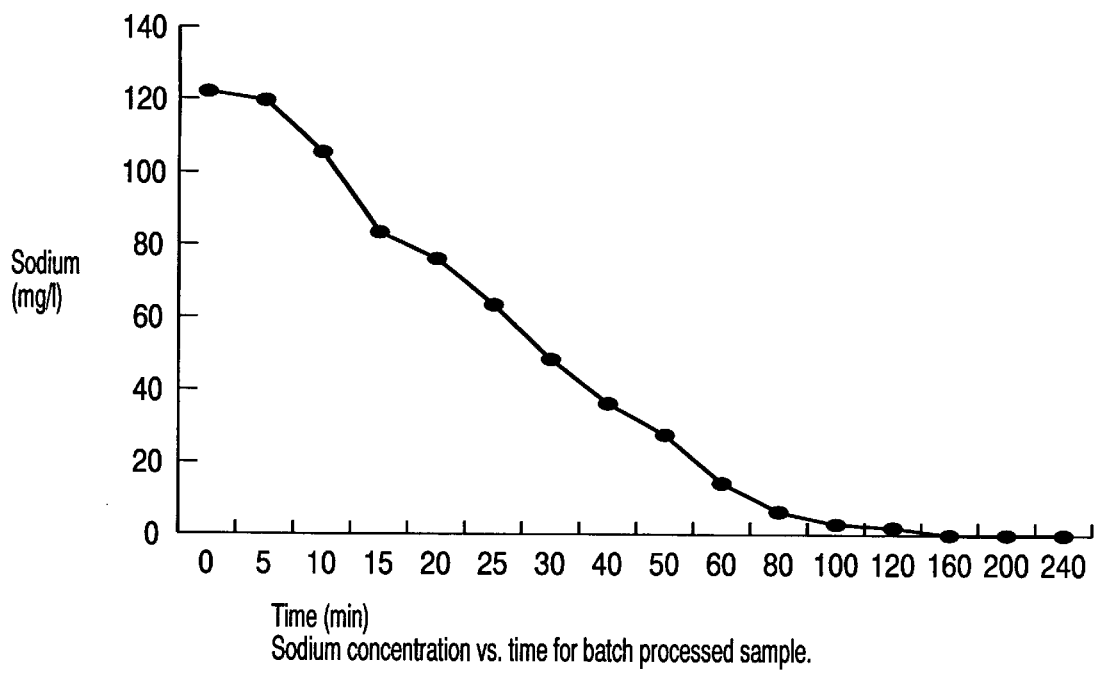
Figure 9D:
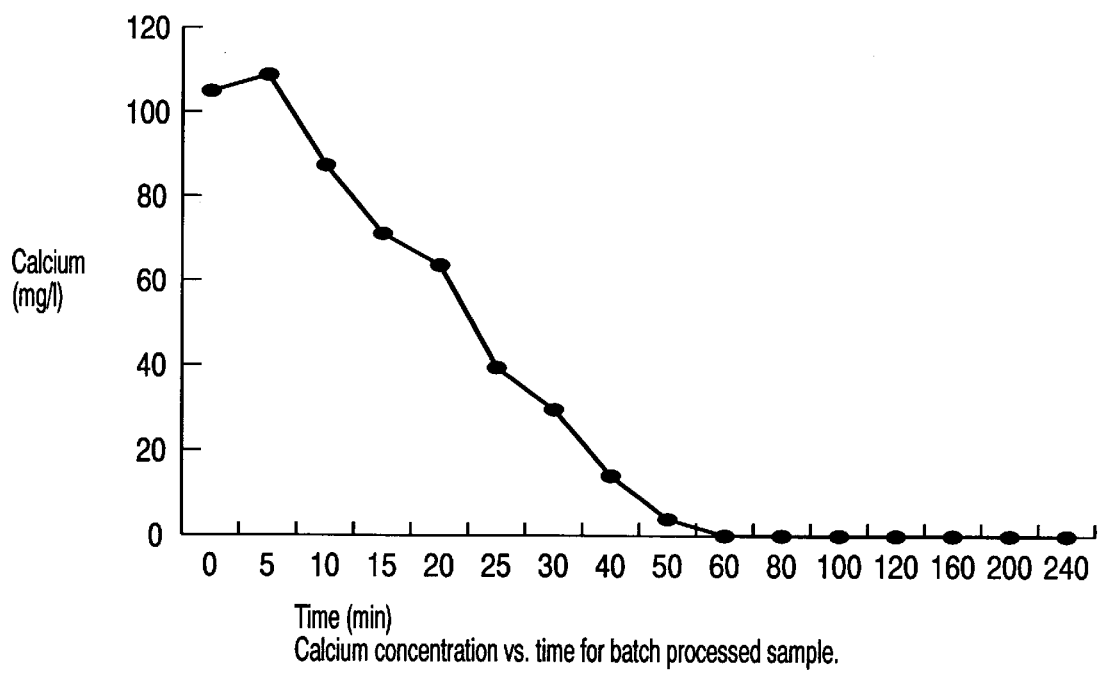
Figure 9E:
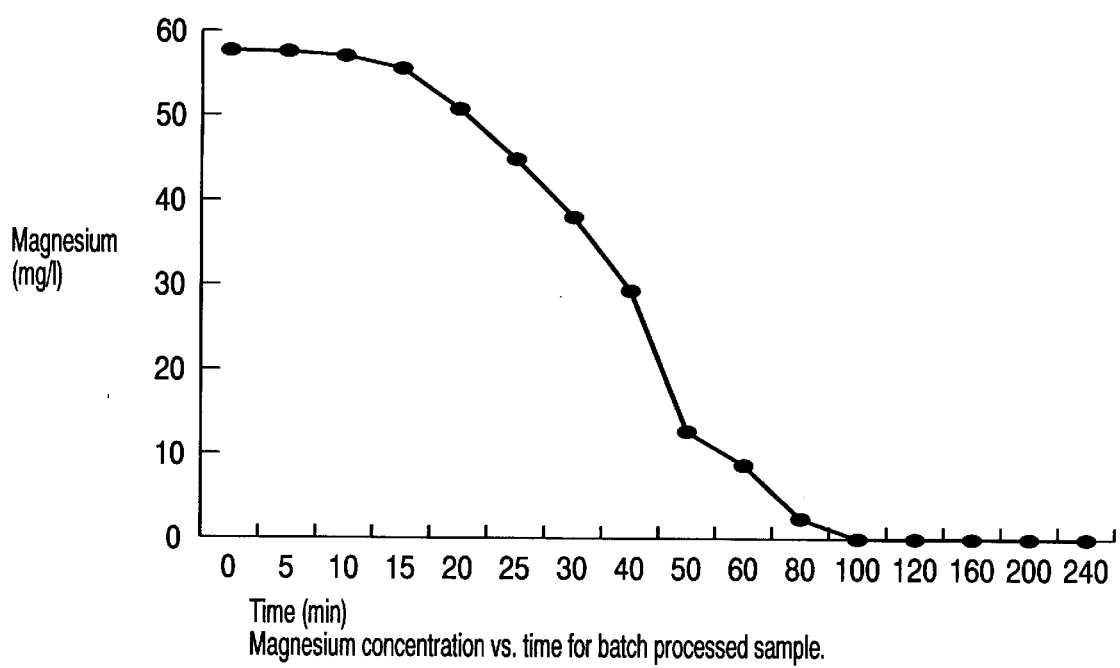

FIG. 8. illustrates an apparatus constructed in accordance with the present invention. This apparatus comprises three tanks 102, 104, 106. The three tanks were used in series to deionize city of Pueblo, Colo. sewage effluent. The effluent was introduced at the inlet 108 to the first tank 102 and the final product exited the system from outlet 122 of tank 106. Overall, the system could deionize up to 1500 milliliters per minute (ml/min).

In this system, tanks 102 and 106 had identical construction. Each was provided with six deionization cells. In both tanks, 102, 106, the HSAAM electrodes in adjacent deionization cells had different polarities. This gave a voltage-interleaved deionization arrangement in each tank. As a consequence, both tanks 102, 106 were arranged to take out both positive and negative ions. Therefore, each of these tanks had two voltage sources, one voltage source arranged to create positively charged deionization cells, and a second voltage source arranged to create a negatively charged deionization cells.

Tank 102 was connected to intermediate tank 104. The partially deionized effluent from tank 102 passed through outlet 110, valve 112, inlet 114 and on into second tank 104. Although shown as a single inlet, inlet 114 was in fact a multiplicity of conduits entering second tank 104. The purpose of valve 112 is to interrupt the electrical conduction process between tanks 102 and 104. Also, outlet 110 of tank 102 may be provided with a bleed (not shown) to test the partially deionized effluent to assess the performance of tank 102.

Tank 104 is also provided with six deionization cells. However, these deionization cells are of double length. The HSAAM electrodes of each are provided with a rabbit joint at their ends so that they can mate with a complementary structure on a similar plate. In contrast to tank 102, all the deionization cells in tank 104 have positively charged HSAAM electrodes. This means that only negative ions are removed in tank 104.

The further deionized effluent from tank 104 exits through outlet 116, passes through valve 118, enters inlet 120, and from there enters tank 106 itself. Outlet 116 may also be provided with a bleed so as to sample the effluent from tank 104.

As stated above, tank 106 is similar in construction to tank 102. It further deionizes the liquid entering inlet 120. The deionized output from tank 106 exits the system at outlet 122.

In tanks 102 and 106, the HSAAM electrodes were 6½"×13"×0.4" and were formed from 2 plates of dimensions 6½"×6½"×0.4". To form the plates of tanks 102, 106 a 0.25" rabbit joint was cut in one edge and a complementary joint was cut in an opposing edge from an abutting plate. The two plates were fitted into frames and were glued end to end with a conductive epoxy. For tank 104, four plates were fitted in a similar process. For all tanks, electrical connection was made with a carbon fiber wire that was adhesively joined, such as by epoxy, to the clips mounting the HSAAM plates to the frame.

In tanks 102 and 106, water was introduced into each tank near the top of the HSAAM electrodes at a single point. Once inside the tank, the water was mixed continuously during deionization. The purpose of mixing is to help prevent the creation of localized acidic or caustic regions of the tank, during deionization. Mixing can be accomplished by aerating the tank at multiple points along the bottom of that tank, although other mixing means, such as magnetic or mechanical stirrers and spinners may be used instead. The overall retention time of water in a given tank, was determined solely by the flow rate which, as stated above, under 1500 ml/min.

As an alternative to introducing water at a single point in each of the tanks, one may provide multiple inlets in each tank, at one end of the HSAAM and non-HSAAM plates, and multiple outlets at the other end of the plates. In such case, the water would travel the length of a deionization cell before exiting.

Tanks 102 and 106 had voltages applied to them which were dependent on the conductivity of water being deionized. Applied voltages range from 0.01–15 volts during the deionization in these two tanks. The corresponding amperage ranges from 0.01–10 amps during deionization. The deionization rate of the water (i.e., the rate at which ions were removed) was a function of the type of water being deionized. Hence, the rate for deionization in tank 102, which had more impurities, was greater than that of tank 106, which was treating water that had been twice deionized.

The second tank, 104 removed negatively charged ions. This resulted in the water in this tank becoming caustic, thus creating a caustic flock. The second tank was operated in a serpentine flow pattern with the inlet being placed near the bottom of the HSAAM plates. The voltage and current applied to the water within tank 104 was sufficient to cause electrolysis of the water. Treatment of water in this second tank resulted in the removal of approximately 300–500 $\mu$mho/cm or $\mu$S/cm of conductivity. However, the caustic output from this tank had a pH in the range of 8–12, which then was sent on to the third tank 106.

Table 1 shows the experimental results achieved using the system of FIG. 8. In particular, Table 1 shows the effects of each stage of deionization using an apparatus formed in accordance with the present invention. The values reported in Table 1 indicate that the output from tank 106 (the last tank) is consistent with potable water, as it meets the limitations for Federal water standards.

TABLE 1

Deionization of City of Pueblo, Colorado Sewage Effluent Using the System of FIG 8.

| Parameter | Enter System | Exit 102 | Exit 104 | Exit 106 |
| --- | --- | --- | --- | --- |
| Conductivity $\mu$S | 2000 | 1300 | 900 | 500 |
| pH Range | 7.1–7.7 | 3.3–11.2 | 10.1–12.4 | 6.6–7.2 |
| Total Hardness mg/l | 560 | 492 | 342 | 144 |
| Total Coliform (colonies/100 ml) | over grown | 456 | 5 | 0 |
| Total Alkalinity mg/l | 280 | 60 | 60 | 10 |
| Ammonia mg/l) | 17.1 | 12 | 6 | 4 |
| Total Dissolved Solids mg/l | 1188 | 781 | 540 | 300 |
| Sulfates mg/l | 840 | 830 | 423 | 400 |
| Chloride mg/l | 28 | 10 | 8 | 3 |
| Odor | strong | mild | absent | absent |
| Color | clear green | clear green | clear colorless | clear colorless |

Table 2 shows the experimental results achieved using the system of FIG. 8. In particular, Table 2 shows the effects of each stage of deionization using an apparatus formed in accordance with the present invention.

TABLE 2

Treated Super Fund Site of Yak Tunnel/California Gulch operated by Asarco, Inc. near Leadville, Colorado, deionization results of the system of FIG. 8.

| Parameter | Enter System | Exit 102 | Exit 104 | Exit 106 |
| --- | --- | --- | --- | --- |
| Conductivity $\mu$S | 1240 | 860 | 680 | 300 |
| pH range | 3.2–4.2 | 7.1–7.6 | 8.6–11.1 | 7.1–7.7 |
| Color | opaque/orange | clear orange | clear/colorless | clear/colorless |
| Total Arsenic $\mu$g/l | 2 | not tested | >mdl | >mdl |

TABLE 2-continued

Treated Super Fund Site of Yak Tunnel/California Gulch operated by Asarco, Inc. near Leadville, Colorado, deionization results of the system of FIG. 8.

| Parameter | Enter System | Exit 102 | Exit 104 | Exit 106 |
| --- | --- | --- | --- | --- |
| Total Cadmium $\mu$g/l | 137 | not tested | 100 | 45.7 |
| Total Copper $\mu$g/l | 40 | not tested | 25 | 11 |
| Total Iron $\mu$g/l | 4060 | not tested | 456 | 176 |
| Total Lead $\mu$g/l | 8 | not tested | >mdl | >mdl |
| Total Manganese $\mu$g/l | 13800 | not tested | 5370 | 2970 |
| Total Zinc $\mu$g/l | 38600 | not tested | 23000 | 11400 |
| Total Hardness mg/l | 980 | 376 | 64 | 34 |
| Total Alkalinity mg/l | 0 | 70 | 176 | 72 |
| Sulfate mg/l | 778 | 414 | 231 | 39.8 |
| Chloride mg/l | 16.7 | 4.8 | 4.8 | 5.8 |
| Calcium Hardness mg/l | 240 | 276 | 64 | 34 |
| Magnesium Hardness mg/l | 740 | 100 | >mdl | >mdl |

In addition to continuous flow deionization, the apparatus can also be used for batch process deionization. Results of batch processing are given by FIGS. 9A–9E. In particular, these figures show the results of deionizing a batch of water spiked with known concentrations of iron, sodium, and copper ions. Iron and copper ions were removed to a level below 1 part per billion, sodium ions were removed to a level below 2 parts per million, and conductivity was reduced from 12,150 $\mu$S to 410 $\mu$S.

The pH and conductivity level of the water in each of the three tanks was monitored to establish when the HSAAM plates were saturated. A rise in the conductivity of the water outflow without a corresponding change in the pH indicates that the HSAAM plates were saturated with ions and that the apparatus needs to be regenerated. Similarly, stored charge in conjunction with pH & conductivity in the cell can be used to indicate when the apparatus needs to be regenerated. In general, HSAAM plates become discolored as they deionize the water. The type and color of change depends on the type of water being treated. For instance, water having high sulfate levels causes the plates to turn white as the sulfate is deposited on them. Similarly, water having high organic waste content causes the HSAAM plates to turn to a brown color. Either way, this discoloration indicates that regeneration is necessary due to ion saturation levels.

With tanks 102 and 106, it was possible to either form an oxidized flock or a concentrated ion solution during regeneration. Whether one or the other was created, depended upon the voltage level applied. Applying a voltage lower than that necessary to cause the electrolysis of water, allowed one to collect the ion rich water from the negatively or positively charged deionization cells via the bottom holes 82, 84, as shown in FIG. 7. On the other hand, applying a voltage sufficient to electrolyze the water, resulted in the formation of an oxidized flock. In such case, mixing was required during regeneration to produce and discharge this flock from the tank.

In the second tank, 104, negatively charged ions were removed. This resulted in the water becoming caustic, resulting in a pH on the order of 8–12. This also resulted in the formation of a caustic flock. During operation, the voltage applied to the deionization cells in tank 104 was sufficient to cause electrolysis of water. Thus, the voltage applied was on the order of 1 to 12 volts with an amperage of between 1.3–12 amps. The effect of this was that the second tank, 104, caused the removal of 300–500 $\mu$mho/cm or $\mu$S/cm of conductivity.

Regeneration of the plates in the second tank, 104, was conducted by reversing the current applied to the plates with enough voltage to overcome the cells' stored charge (counter EMF). Again, a rise in the conductivity of water outflow without a change in pH, indicated that the HSAAM's in the second tank 104 were saturated with ions, signifying that the apparatus needed to be regenerated. This could most easily be discerned by the fact that the HSAAM plates became severely discolored, the type and color of change depending on the type of water being cleaned. During regeneration, an oxidized flock was produced by operating the device at a voltage needed to counter the EMF that had built up during the operation of the system.

These flocks could then be collected through the holes in the bottom of the tank 104. After regeneration, all three tanks 102, 104, 106 can then be reused with the same efficacy as before.

The power supplies used to supply the necessary voltages for deionization preferably can be controlled over a finite range of voltages. Typically, then, the power supplies will be of the type that can be plugged into an AC outlet. However, as fairly low voltages and currents are needed, portable, battery-powered power supplies may be used in certain settings. In this vein, a solar-powered deionization apparatus has been constructed and successfully operated, albeit at a low throughput. Solar-powered and battery-powered systems of reduced size provide the dual advantages of low cost and high portability.

Figure 10:
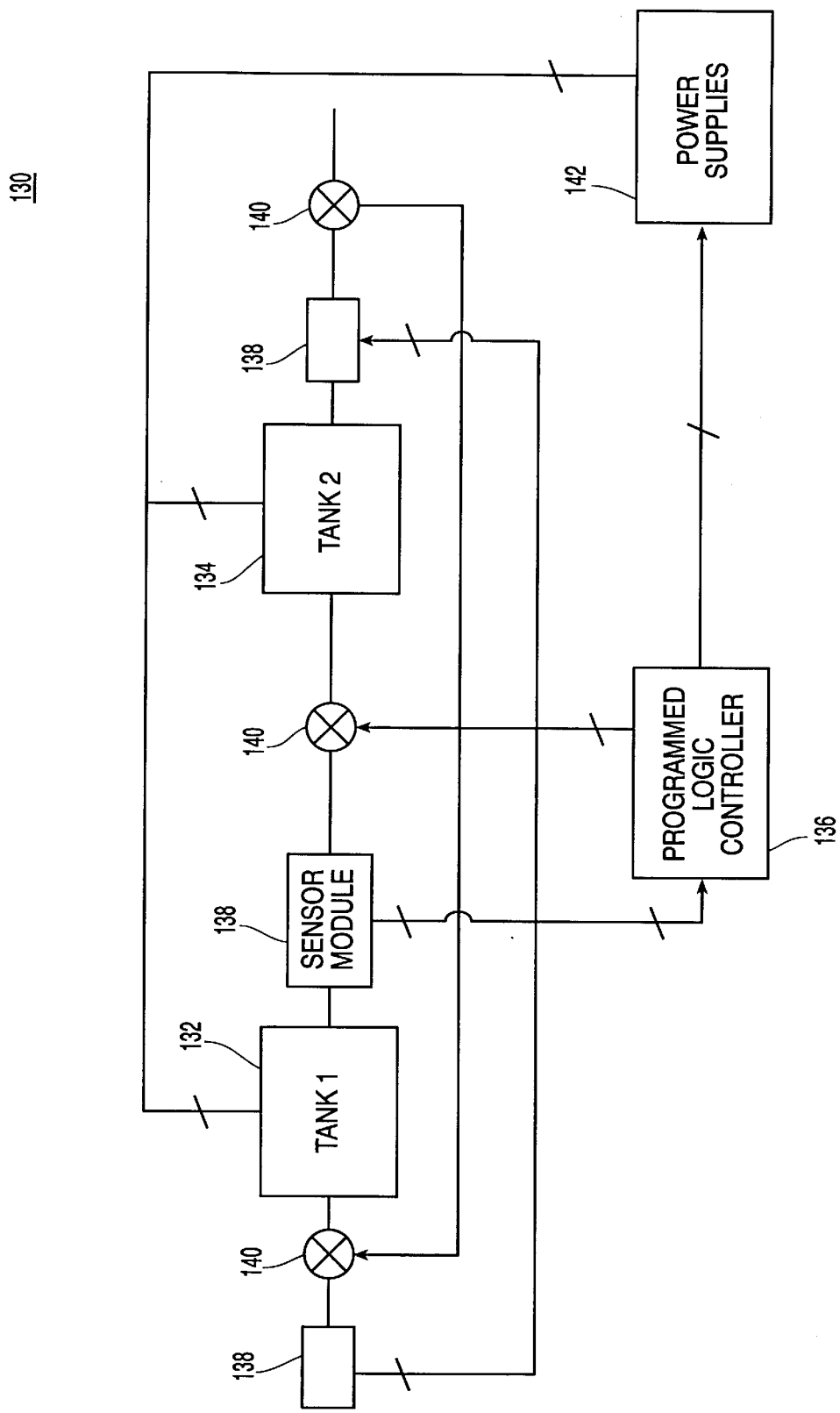
FIG. 10 present an block diagram for an automated deionization apparatus.

FIG. 10 shows an overview of an automated deionization control system 130 in accordance with the present invention. The system monitors the water quality to automatically adjust the voltages to achieve a target rate of deionization. As shown in this figure, the system 130 controls the operation of two tanks 132, 134. It should be kept in mind, however, that a control system could also be used with either a single tank, or with three or more tanks, be they connected in serial, or in parallel, or in a combination of the two.

The control system uses sensor modules 138, which monitor the effluent at various stages in the deionization plant. These sensor modules 138 comprises one or more sensors configured to gauge such properties as pH, conductivity, water flow rate, temperature, optical characteristics, etc., of the effluent. The sensor modules may also include ion-specific probes, such as those measuring fluoride, ammonia, chloride and others, such as those listed in Tables 1 & 2. The sensors may sample the effluent continuously, at predetermined periodic intervals, or upon request from the controller 136. While in the preferred embodiment, the sensors are shown to sample the effluent in the piping connecting to a tank, the sensors may be placed inside a tank, as well.

The sensors data is presented to a programmed logic controller 136. The controller may be implemented as a microprocessor, or equivalent. The controller 136 assesses the performance of the tanks 132, 134 based on the sensor data. The controller uses these data to determine whether any changes in the flow rate and the flow pattern should be made. If so, the controller outputs signals to motor-driven valves 140 to adjust the flow rate. These valves may be controlled either simultaneously, or individually. In cases where there are multiple inlets or multiple outlets, it may be possible to control only a subset of these so as to ensure no overflow of any of the tanks.

In addition to selectively controlling the flow rate, the controller 136 also controls the voltages applied by the various power supplies, shown generally as 142. In particular, the controller processes the sensor data and outputs control signals to the power supplies, to thereby control the voltages and/or currents applied to the deionization cells in the tank. The controller 136 uses the sensor data to determine whether the electrodes in the tank need to be regenerated and, if so, outputs the appropriate signals to the power supplies to effect this.

A control system as described above may be useful in a large scale deionization apparatus capable of handling flow rates on the order of several thousands of gallons per hour. Thus, such an apparatus may be scaled up to serve the deionization needs of industrial plants, city water and sewage treatment plants, and the like. Experimental results have shown that the electrode dimensions and the number of electrodes can be increased linearly without significantly impacting either the voltage applied or the current drawn.

It should be noted that the apparatus of the present invention does not, strictly speaking, perform capacitive deionization in that the non-HSAAM (non-absorptive) electrodes never actually store a charge. Indeed, ions are never deposited on these electrodes, regardless of how these electrodes are charged; only the HSAAM electrodes ever trap and store ions.

It should also be noted that the foregoing preferred embodiments teach the formation and use of planar electrodes. However, alternate electrode and deionization cell geometries may also be used. One such example is an annular deionization cell comprising 1) an solid or annular inner non-HSAAM electrode, 2) an annular HSAAM electrode concentric with the inner non-HSAAM electrode, and 3) an annular outer non-HSAAM electrode, concentric with the first two electrodes. Such an arrangement would allow for fluid flow between the annular HSAAM electrode and the two non-HSAAM electrodes. However, in such an arrangement, the inner and outer non-HSAAM electrodes would have different surface areas facing the HSAAM electrode. Therefore, it may be necessary to use either different voltages or currents between the two non-HSAAM electrodes and the HSAAM electrode sandwiched between the two.

While the present invention has been disclosed with reference to certain preferred embodiments, these should not be considered to limit the present invention. One skilled in the art will readily recognize that variations of these embodiments are possible, each falling within the scope of the invention, as set forth in the claims below.

What is claimed is:

1. A non-sacrificial absorptive electrode comprising:
   at least one from the group consisting of dihydroxy benzenes, trihydroxy benzenes, dihydroxy naphthalenes and trihydroxy naphthalenes;
   formaldehyde;
   a carbon reinforcing agent;
   a catalyst;
   or reaction products thereof, together in a carbonized form,
   wherein said electrode has a thickness greater than 3 mm and the carbon reinforcing agent is substantially dispersed throughout said thickness.

2. The electrode of claim 1, wherein:
said one from the group consisting of dihydroxy benzenes, trihydroxy benzenes, dihydroxy naphthalenes and trihydroxy naphthalenes is resorcinol.

3. The electrode of claim 2, wherein:
said carbon reinforcing agent is at least one from the group consisting of carbon fiber, carbon felt and cellulose.

4. A liquid deionizing apparatus comprising:
a first tank member having at least one opening for the entry of said liquid;
a plurality of spaced apart non-sacrificial absorptive electrodes of a first type positioned in said first tank member, each of said electrodes of a first type having a pair of side surfaces facing in different directions;
a plurality of non-sacrificial electrodes of a second type positioned on either side of each of said electrodes of a first type, said electrodes of a second type having a different composition than the electrodes of a first type; and
a first voltage source arranged to apply a first voltage differential between at least a first electrode of a first type and a corresponding pair of electrodes of a second type on either side of said first electrode of a first type; wherein
said electrodes of a first type comprise:
at least one from the group consisting of dihydroxy benzenes, trihydroxy benzenes, dihydroxy naphthalenes and trihydroxy naphthalenes;
formaldehyde;
a carbon reinforcing agent;
a catalyst; or
reaction products thereof, together in a carbonized form,
said electrodes of the first type having a thickness of at least 1 mm.

5. The apparatus of claim 4, wherein said electrode of a second type is one from the group consisting of carbon cloth, carbon felt, graphite, gold, platinum, conductive plastic and a glassy carbon.

6. The apparatus of claim 4, further comprising mixing means placed in the tank and arranged to mix a liquid being deionized in the tank.

7. The apparatus of claim 4, where the mixing means comprises an aerator placed along an inside bottom surface of the tank, said aerator arranged to introduce a gas into the liquid.

8. The apparatus of claim 4, wherein the electrodes of a first type are slanted at an angle relative to the electrodes of a second type, in the first tank member.

9. The apparatus of claim 4 wherein
at least one electrode of a second type is affixed to each of oppositely facing first and second sides of a substantially flat, non-conductive structural support member, the electrode of the second type on the first side of said structural support member being electrically isolated from the electrode of the second type on the second side of said structural support member, and
said structural support member with said electrodes of the second type mounted thereon being positioned between two electrodes of the first type.

10. A liquid deionizing apparatus comprising:
a first tank member having at least one opening for the entry of said liquid;
a plurality of spaced apart non-sacrificial absorptive electrodes of a first type positioned in said first tank member, each of said electrodes of a first type having a pair of side surfaces facing in different directions;
a plurality of non-sacrificial electrodes of a second type positioned on either side of each of said electrodes of a first type; and
a first voltage source arranged to apply a first voltage differential between at least a first electrode of a first type and a corresponding pair of electrodes of a second type on either side of said first electrode of a first type; and
a plurality of holes placed on a bottom member of the first tank member between said spaced apart electrodes of a first type, said holes being sized to accommodate the removal of a solid flock, when a polarity of the first voltage differential is reversed, wherein
at least one electrode of a second type is affixed to each of oppositely facing first and second sides of a substantially flat, non-conductive structural support member, the electrode of the second type on the first side of said structural support member being electrically isolated from the electrode of the second type on the second side of said structural support member, and
said structural support member with said electrodes of the second type mounted thereon being positioned between two electrodes of the first type, and wherein
said electrodes of a first type comprise:
at least one from the group consisting of dihydroxy benzenes, trihydroxy benzenes, dihydroxy naphthalenes and trihydroxy naphthalenes;
formaldehyde;
a carbon reinforcing agent;
a catalyst; or
reaction products thereof, together in a carbonized form,
said electrodes of the first type having a thickness of at least 1 mm.

11. The apparatus of claim 10, further comprising mixing means placed in the tank and arranged to mix a liquid being deionized in the tank.

12. The apparatus of claim 11, where the mixing means comprises an aerator placed along an inside bottom surface of the tank, said aerator arranged to introduce a gas into the liquid.

13. A liquid deionizing apparatus comprising:
a first tank member having at least one opening for the entry of said liquid;
a plurality of spaced apart non-sacrificial absorptive electrodes of a first type positioned in said first tank member, each of said electrodes of a first type having a pair of side surfaces facing in different directions;
a plurality of non-sacrificial electrodes of a second type positioned on either side of each of said electrodes of a first type, said electrodes of a second type having a different composition than the electrodes of a first type;
a first voltage source arranged to apply a first voltage differential between at least a first electrode of a first type and a corresponding pair of electrodes of a second type an either side of said first electrode of a first type; and
a second voltage source arranged to apply a second voltage differential between a second electrode of a first type, and a corresponding pair of electrodes of a second type positioned on either side of said second electrode of a first type, in the first tank member.

14. The apparatus of claim 13, wherein the first and second voltage differentials have different polarities.

15. The apparatus of claim 13, further comprising a second tank member having an inlet connected to an outlet of said first tank member; and a third voltage source arranged to provide a third voltage differential between at least a first electrode of a first type in the second tank, and a corresponding pair of electrodes of a second type on either side of said first electrode of a first type, in the second tank member.

16. The apparatus of claim 15, further comprising a fourth voltage source arranged to provide a fourth voltage differential between at least a second electrode of a first type in the second tank, and a corresponding pair of electrodes of a second type on either side of said first electrode of a first type, in the second tank member.

17. The apparatus of claim 16, wherein the first and second voltage differentials have different polarities, and the third and fourth voltage differentials have different polarities.

18. The apparatus of claim 16 further comprising a third tank member having an inlet connected to an outlet of the second tank member; and a fifth voltage source arranged to provide a fifth voltage differential between at least a first electrode of a first type in the third tank, and a corresponding pair of electrodes of a second type on either side of said first electrode of a first type, in the third tank.

19. The apparatus of claim 18, further comprising a a sixth voltage source arranged to provide a sixth voltage differential between at least a second electrode of a first type in the third tank, and a corresponding pair of electrodes of a second type on either side of said first electrode of a first type, in the third tank member.

20. The apparatus of claim 19, wherein the first and second voltage differentials have different polarities, the third and fourth voltage differentials have different polarities, and the fifth and sixth voltage differentials have different polarities.

21. The apparatus of claim 13 wherein at least one electrode of a second type is affixed to each of oppositely facing first and second sides of a substantially flat, non-conductive structural support member, the electrode of the second type on the first side of said structural support member being electrically isolated from the electrode of the second type on the second side of said structural support member, and said structural support member with said electrodes of the second type mounted thereon being positioned between two electrodes of the first type.

22. The apparatus of claim 21, wherein said electrodes of a first type comprise:

at least one from the group consisting of dihydroxy benzenes, trihydroxy benzenes, dihydroxy naphthalenes and trihydroxy naphthalenes;

formaldehyde;

a carbon reinforcing agent;

a catalyst;

or reaction products thereof, together in a carbonized form, said electrodes of a first type having a thickness of at least 1 mm.

23. The apparatus of claim 22, wherein said electrode of a second type is one from the group consisting of carbon cloth, carbon felt, graphite, gold, platinum, conductive plastic and glassy carbon.

24. The apparatus of claim 13, further comprising:

at least a first sensor arranged to measure a property of the liquid being treated and output a first data signal reflective of said property; and a controller receiving said first data signal and outputing a first control signal in response thereto, said first control signal adjusting at least one of said first and second voltage differentials applied by respective said first and second voltage sources.

25. The apparatus of claim 24, further comprising a valve controlling a flow rate of liquid into said first tank, wherein said controller outputs a second control signal which adjusts a position of said valve such that said flow rate is affected.

* * * * *